(12) United States Patent
Boote et al.

(10) Patent No.: US 9,193,135 B2
(45) Date of Patent: Nov. 24, 2015

(54) LAMINATED GLAZING

(75) Inventors: Joseph Jeremy Boote, Ormskirk (GB); Rebecca Butcher, Ormskirk (GB)

(73) Assignee: PILKINGTON GROUP LIMITED, Lathom, Lancashire (GB)

( * ) Notice: Subject to any disclaimer, the term of this patent is extended or adjusted under 35 U.S.C. 154(b) by 0 days.

(21) Appl. No.: 13/496,691

(22) PCT Filed: Sep. 17, 2010

(86) PCT No.: PCT/GB2010/051566
§ 371 (c)(1),
(2), (4) Date: Mar. 16, 2012

(87) PCT Pub. No.: WO2011/033313
PCT Pub. Date: Mar. 24, 2011

(65) Prior Publication Data
US 2012/0176656 A1    Jul. 12, 2012

(30) Foreign Application Priority Data

Sep. 18, 2009  (GB) .................................. 0916379.1

(51) Int. Cl.
*G02F 1/015*  (2006.01)
*B32B 17/10*  (2006.01)
*G02F 1/17*  (2006.01)

(52) U.S. Cl.
CPC ........... *B32B 17/10036* (2013.01); *B32B 17/10* (2013.01); *B32B 17/1077* (2013.01);
(Continued)

(58) Field of Classification Search
CPC ........... G02F 1/172; G02F 1/15; G02F 1/153; G02F 1/1533; G02F 1/155; G02F 1/17; G02B 5/02; G02B 5/0226; G02B 5/0242; B32B 17/10036; B32B 17/1077

USPC ........... 359/240–253, 290–297, 267; 345/85, 345/107

See application file for complete search history.

(56) References Cited

U.S. PATENT DOCUMENTS 5,059,254 A   10/1991 Yaba et al.
5,093,041 A    3/1992 Check, III et al.
(Continued)

FOREIGN PATENT DOCUMENTS

EP              1458564 B1    9/2004
WO    WO 2005/102688 A2    11/2005
(Continued)

OTHER PUBLICATIONS

* International Search Report (PCT/ISA/210) issued on Jan. 18, 2011, by United Kingdom Patent Office as the International Searching Authority for International Application No. PCT/GB2010/051566.
(Continued)

*Primary Examiner* — Ricky Mack
*Assistant Examiner* — Daniele Manikeu
(74) *Attorney, Agent, or Firm* — Buchanan Ingersoll & Rooney PC

(57) ABSTRACT

A laminated glazing comprising an SPD ply comprising a suspended particle device having a low light transmission off-state and a high light transmission on-state, at least one interlayer ply comprising an interlayer material, and at least one glazing ply is disclosed. The interlayer material has been dried to a predetermined moisture content to increase the time over which the suspended particle device is switchable between the low light transmission off-state and the high light transmission on-state. Use of a dried interlayer to increase the time over which an SPD film is switchable between a low light transmission off-state and a high light transmission on-state is also disclosed. Additionally a process for producing the aforementioned laminated glazing is disclosed. It has been found that the moisture content of the interlayer material is a factor in determining the switching characteristics over time of an SPD film incorporated into a laminated glazing.

20 Claims, 3 Drawing Sheets

(52) U.S. Cl.
CPC ..... *B32B17/10174* (2013.01); *B32B 17/10532* (2013.01); *B32B 17/10761* (2013.01); *G02F 1/172* (2013.01)

(56) References Cited

U.S. PATENT DOCUMENTS

| | | | |
|---|---|---|---|
| 5,409,734 | A | 4/1995 | Lee et al. |
| 6,123,986 | A * | 9/2000 | Maschwitz et al. ........... 427/162 |
| 6,429,961 | B1 * | 8/2002 | Harary et al. ................. 359/296 |
| 6,516,239 | B1 | 2/2003 | Madden et al. |
| 6,897,997 | B2 * | 5/2005 | Malvino ....................... 359/296 |
| 7,704,342 | B2 | 4/2010 | Bourcier et al. |
| 2003/0148114 | A1 | 8/2003 | Bourcier et al. |
| 2004/0185195 | A1 | 9/2004 | Anderson et al. |
| 2004/0195967 | A1 | 10/2004 | Padiyath et al. |
| 2005/0227061 | A1 * | 10/2005 | Slovak et al. ................. 428/323 |
| 2008/0186562 | A2 * | 8/2008 | Moskowitz ................... 359/296 |
| 2009/0176101 | A1 | 7/2009 | Greenall et al. |

FOREIGN PATENT DOCUMENTS

| | | |
|---|---|---|
| WO | WO 2007/122428 A1 | 11/2007 |
| WO | 2008/082624 A2 | 7/2008 |
| WO | 2009/073161 A1 | 6/2009 |

OTHER PUBLICATIONS

UK Patents Act 1977:Search Report Under Section 17(5) dated Apr. 26, 2010 issued in the corresponding GB Patent Application No. 0916379.1.

Kempe Michael D., "Control of Moisture Ingress into Photovoltaic Modules", National Renewable Energy Laboratory (NREL), Golden, Colorado, US, Feb. 2005, pp. 1-4, Report/Project No. NREL/CP-520-37390.

Sottile, G.M., "2004 Survey of United States Architects on the Subject of Switchable Glazings", Research Frontiers Incorporated, Woodbury, NY, US, 2004, pp. 1-7, Society of Vacuum Coaters, 47th Annual Technical Conference Proceedings ISSN 0737-5921.

* cited by examiner

LAMINATED GLAZING

The present invention relates to a laminated glazing and to a process for producing a laminated glazing, the laminated glazing comprising a suspended particle device.

In recent years, smart glazings (also known as switchable glazings) have become popular both in buildings and in vehicles. Smart glazings allow users to control the amount of light and heat passing through the glazing. Typically, smart glazings have at least one ply of glass within a laminated glazing structure with the added functionality being provided by a functional device or film within the structure. Various smart glazing technologies are available including electrochromic devices, suspended particles devices and liquid crystal devices.

Suspended particle devices (also known as SPDs) generally comprise particles suspended within a liquid suspension medium, the liquid suspension medium being held within a polymer. The SPD film is generally switchable between a dark state (generally when no voltage is applied) and a highly transparent state (usually when voltage is applied). The degree of relative alignment between the particles in the SPD is generally determined by the applied voltage so that an SPD based device exhibits a variable optical transmission when a variable voltage is applied.

It is known from U.S. Pat. No. 5,409,734 that when making a film for use as a light valve, such as an SPD film, that the light valve may be produced by dissolving a polymeric resin in a solvent into which a liquid polarizing suspension is added. This combination is mixed and forms a stable emulsion. The emulsion is cast onto a PET or glass substrate which has been pre-coated with a 200 µm layer of a TCO electrode, and spread thereon to produce a film 10 to 200 µm thick. The film is dried at room temperature or 50° to 90° C., resulting in phase separation and polymer solidification. After complete drying the film is 50 µm thick. A finished cell is obtained by laminating to a second TCO coated substrate.

It is known from U.S. Pat. No. 5,093,041 and the citations therein, that light polarizing materials such as colloidal suspensions of herapathite and herapathite-like light polarizing crystals may be used in sheet polarizers. It is well known that such sheet polarizers are frequently subject to degradation due to high levels of heat, ultraviolet radiation and/or especially moisture.

In U.S. Pat. No. 6,516,239 there is disclosed polyhalide particles having great chemical stability when exposed to water, even extremely hot water, that may be used in liquid suspensions and films for SPD light valves as well as in set suspension for use as or in a sheet polarizer. In this prior art document it is stated that the properties of the particles can be of substantial importance in achieving a long life in an SPD device which is exposed to the atmosphere.

US2004/0185195A1 discloses laminated glass comprised of at least two layers of transparent glass with adjacent glass layers separated by a transparent solid non-glass layer, wherein at least one transparent non-glass interlayer contains a device comprised of at least one element selected from the group consisting of solid state lighting, heat sensors, light sensors, pressure sensors, thin film capacitance sensors, photovoltaic cells, thin film batteries, liquid crystal display films, suspended particle device films, and transparent electrical conductors. Specific examples are given which include LED devices in the laminated glass. One example is given of a laminated glass containing an electroluminescent panel for use as a light source. The laminated glass consists of a first piece of annealed glass with a first ionomer resin sheet in contact therewith. An electroluminescent panel is centred on the first ionomer sheet and a second sheet of the ionomer resin sheet is placed over the electroluminescent panel. A second piece of glass is positioned on top of the second ionomer resin sheet and the assembly is laminated. Prior to the lamination process, the sheets of ionomer resin had a moisture content of 0.06% by weight. When incorporated in the laminated glazing, the electroluminescent panel provided light and functioned as it had before encapsulation within the glass. The electroluminescent panel was said to be protected from physical damage and attack from moisture, air, etc.

WO-A-2005/102688 relates generally to SPD devices, especially SPD devices used as light valves and to methods for laminating SPD devices.

Suspended particle devices are known to degrade when subjected to relatively high temperatures especially when those high temperatures are experienced for relatively long periods of time. For example, a typical SPD device, if stored at 100° C. for 500 hours, degrades so that the light transmission in the on-state can decrease by more than 20% from its starting value.

We have now discovered that a major contributor to the degradation of SPD devices involves moisture present in particular components in the laminated glazing, even at very low levels of moisture.

It is the aim of the present invention to overcome difficulties of the prior art and to, in particular, overcome the difficulties, especially relating to moisture content, which result in degradation of SPD devices.

The present invention accordingly provides, in a first aspect, a laminated glazing comprising an SPD ply comprising a suspended particle device having a low light transmission off-state and a high light transmission on-state, at least one interlayer ply comprising an interlayer material, and at least one glazing ply, wherein the interlayer material has been dried to a predetermined moisture content to increase the time over which the suspended particle device is switchable between the low light transmission off-state and the high light transmission on-state. This is advantageous because the inventors have, surprisingly, discovered that, at even a relatively low water content of the interlayer material, degradation of the SPD device, even at relatively high temperatures, is much reduced or eliminated. Suitably the interlayer ply is not part of the SPD ply.

If a laminated glazing is constructed according to the first aspect of the invention without drying the interlayer material, the switching characteristics of the SPD device have been found to degrade in a shorter time than when the same interlayer material is dried. For the avoidance of doubt, the switching characteristics of the film refers to the ability of the SPD device to switch between the low light transmission off-state and the high light transmission on-state upon application of a suitable electric field i.e. a voltage across the SPD device.

If the interlayer material has a moisture content greater than the predetermined moisture content, the switching characteristics of the SPD device may be degraded in a shorter time.

Generally, the suspended particle device comprises at least two spaced, opposed panes at least one of which is transparent, and a light modulating element. Each pane may be a ply of polyethylene terephthalate (PET) with an electroconductive film such as ITO on at least a portion of a major surface thereof. The light modulating element may comprise a liquid suspension of particles but preferably comprises a plastics film comprising distributed droplets of the liquid suspension of particles.

The interlayer material in the laminated glazing preferably comprises polyvinyl butyral (PVB), ethylene vinyl acetate (EVA), polyurethane or silicone.

Preferably where the interlayer material comprises polyvinyl butyral, the predetermined moisture content is 0.26 weight % or lower, preferably 0.25 weight % or lower. Preferably, where the interlayer material comprises ethylene vinyl acetate the predetermined moisture content is 0.24 weight % or lower, preferably 0.23 weight % or lower, more preferably 16 weight % or lower.

The laminated glazing of the present invention may further comprise one or more plastics plies. Conveniently, one of these plastics plies, if present, may carry an infra-red reflecting coating. The infra-red reflecting coating may be a low e and/or a solar control coating to reduce heat flow through the glazing. The plastics ply may be, for example, a flexible plastic substrate. The preferred material for forming the plastics ply is PET.

Typically, the infra-red reflecting coating comprises a silver based coating. This coating may comprise one or more layers of silver or of silver alloy and dielectric layers of, for example, metal or metalloid oxides.

Preferably, the laminated glazing comprises at least two interlayer plies. The glazing may be such that there are two interlayer plies intended to be laminated on either side of the SPD.

The SPD may preferably be incorporated in a third interlayer ply which has a portion of the shape and size of the SPD cut out (in a so-called "picture frame"). Such a construction is described in WO2007/122428 at page 6 in particular. This type of construction is advantageous because it allows a strong and efficient lamination of the SPD within the laminated glazing.

Generally, there will be two glazing plies in laminated glazing. Usually, the SPD film will be situated between two glazing plies with one or two layers of interlayer material on either side of the SPD film. Further layers may be incorporated between the glazing and interlayer plies or between the interlayer and SPD plies. Preferably, the, or each, glazing ply is a glass ply.

One or more of the glazing plies may carry a coating on the outer or inner surface (referring to its position of the surface in the laminated glazing). These coatings may be to modify the optical properties of the laminated glazing (e.g. heat reflecting coatings for solar control or low emissivity) or to modify the surface properties of the glazing (e.g. to increase the hydrophobicity or the hydrophilicity of the surface). If the glazing has a coating to modify the surface properties of one or more plies then the coating will usually be situated on an outside surface of a glazing, preferably a glass, ply.

Preferably, the interlayer material has a water content of 0.24 weight % or lower, 0.23 weight % or lower, 0.22 weight % or lower, 0.21 weight % or lower, 0.20 weight % or lower, 0.19 weight % or lower, 0.18 weight % or lower, 0.15 weight % or lower, or 0.10 weight % or lower. Generally, the lower the water content of the interlayer material, the better, however it is difficult to eliminate entirely the water content of the interlayer material.

The level of the predetermined moisture content may be chosen for a particular interlayer material and for a particular application of the laminated glazing.

It is well known in the art, see for example "Glass Processing Days, 13-16 Jun. 1999, pages 353-356" that the moisture content of PVB affects the adhesion properties of the PVB. Pummel adhesion is known to be reduced when the moisture content of the PVB is increased.

The interlayer should have sufficient adhesion to other materials in the laminated glazing for the desired application. Suitably the laminated glazing passes appropriate tests for such a laminated glazing to be used for a specific application. This requirement may affect the lower level of water content for the interlayer.

Suitably the interlayer has more than 0.01% by weight of water.

The great advantage of the first aspect of the present invention is that when the water content is at or below 0.26 weight % (PVB) or at or below 0.24 weight % (EVA) in the interlayer material, high temperature degradation of the SPD film is much reduced. Furthermore, lower temperature degradation (as in, for example, normal use) would also be reduced.

It had not previously been appreciated that even the very low moisture content of interlayer materials can contribute to SPD degradation.

It is thought that the water contained in an interlayer material is chemically and/or physically absorbed, in contrast to water vapour in a humid atmosphere.

In a second aspect, the present invention also provides a process for producing a laminated glazing, the process comprising, a) providing an SPD ply comprising a suspended particle device,
b) providing at least one interlayer ply comprising an interlayer material the interlayer material having been dried to a predetermined moisture content,
c) providing at least one glazing ply,
d) laminating together at least the SPD ply, the interlayer ply and the glazing ply.

A process for producing a laminated glazing according to the second aspect of the invention provides the advantage that the switching characteristics of the SPD ply are improved compared to using the at least one interlayer ply comprising the interlayer material with the moisture content of the interlayer material above the predetermined moisture content. That is, a laminated glazing produced according to the second aspect of the present invention is switchable between a low light transmission off-state and a high light transmission on-state for a longer time when the dried interlayer is positioned adjacent the SPD film compared to when the same interlayer has not been dried and is positioned adjacent to the SPD film.

Preferably, the process further comprises a step of drying the interlayer material (before it is incorporated within the laminated glazing) so as to arrive at a water content as discussed above in relation to the first aspect of the invention.

Drying the interlayer material preferably comprises holding the interlayer material at a predetermined temperature (which may be between 20 to 110° C.), under a predetermined pressure (which may be atmospheric pressure or a lower pressure than this) for a predetermined time which can be in the order of 1 to 4 days, preferably 1 to 2 days, most preferably 1 day or shorter.

Alternatively, or additionally, the drying step may comprise storing the interlayer material at a predetermined relative humidity (e.g. between 5% and 55%, preferably under 30%, more preferably under 25% and most preferably under 22%), preferably for a predetermined time, at a predetermined temperature and under a predetermined pressure.

The SPD ply may be first laminated in between two plies of an interlayer material, and this laminated construction may then be dried. Alternatively, the interlayer plies may be dried prior to laminating the SPD ply therebetween. The assembly of SPD ply in between the two interlayer plies may then be laminated to at least one glazing ply.

In a third aspect, the present invention also provides use of a dried interlayer to increase the time over which an SPD film is switchable between a low light transmission off-state and a high light transmission on-state. Suitably the dried interlayer is in sheet form.

The products of the invention find use in all glazing applications including commercial and domestic buildings and transport (e.g. automotive) applications. Products according to the invention are of particular advantage when used in automotive glazings such as sunroofs, windscreen, backlight and/or side glazings.

Embodiments of the present invention will now be described with reference to the accompanying drawings (not to scale) in which—

Figure 1A:
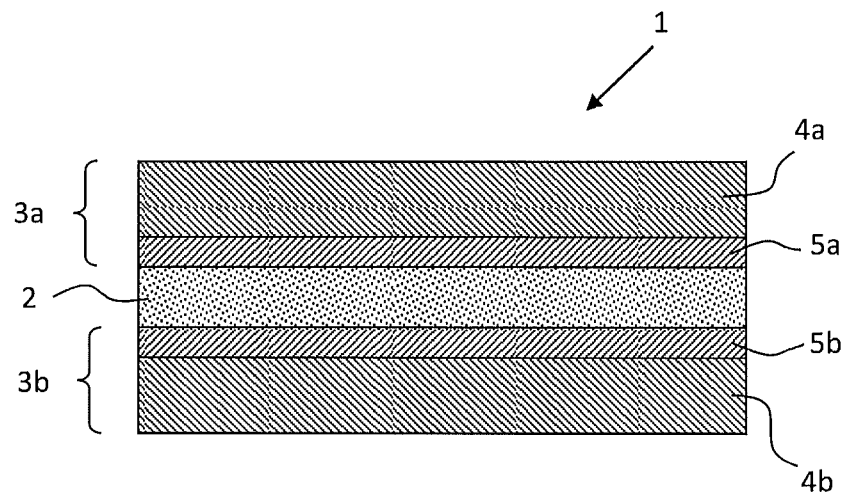
FIG. 1a illustrates a cross-sectional view of a conventional SPD film assembly.

FIG. 1a shows, in schematic cross-section, a conventional SPD film assembly. The SPD film 1 has a laminated structure comprising an active layer of a suspended particle emulsion 2 arranged to lie between a first planar electrode 3a and a second planar electrode 3b. Each planar electrode comprises a ply of a plastics substrate material 4a, 4b (for example of polyethylene terephthalate (PET)), having an electrically conductive coating 5a, 5b (for example an indium tin oxide coating (ITO)) disposed on at least a portion of one surface. The electrically conductive coatings 5a, 5b enable a direct electrical contact between the suspended particle emulsion 2 and an external power supply (not shown) to be provided via suitable electrical connectors.

Figure 1B:
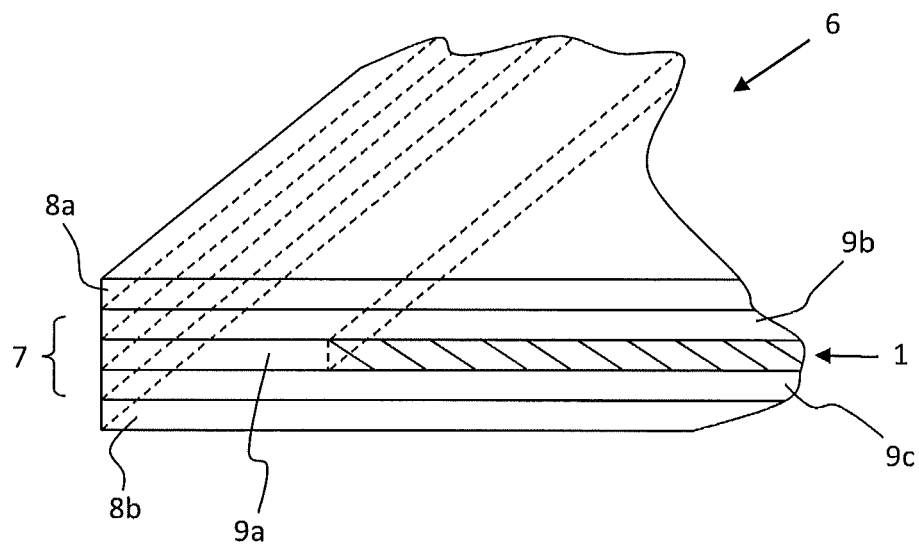
FIG. 1b illustrates schematically a laminated glazing having an SPD film laminated therein.

FIG. 1b illustrates schematically the construction of a laminated glazing having an SPD device laminated therein. The glazing 6 has an SPD film assembly 1 laminated within an interlayer structure 7, which is itself laminated between two plies of glass 8a, 8b. The laminated structure 7 comprises three layers of interlayer material, 9a, 9b, 9c. The first interlayer 9a has a region cut out of the centre in which the SPD film assembly 1 sits, such that the first interlayer 9a forms the "picture frame". Such a construction is disclosed in WO2007/122428. Preferably the thickness of the SPD film assembly 1 is of the same order as the first interlayer 9a. The first interlayer 9a is laminated between second 9b and third 9c interlayers, which are co-extensive with the plies of glass 8a, 8b.

The invention is further illustrated in the following examples.

The water content of an interlayer material varies dependant on the local humidity in which it is stored. It is possible to use the H—OH band at 1930 cm$^{-1}$ in an infrared spectrum as a means to identify the presence of water in materials non-destructively. This can give quantitative information if the intensity of this absorption relative to a background level is correlated with actual water content via another water determination method.

EXAMPLE 1

Laminates were prepared with SPD film that had previously been dried by heating at 90° C. overnight and film that had previously been exposed to 100% relative humidity (RH) and 50° C.

When the SPD film is dried, it is possible that moisture is lost from either of the PET substrates 4a, 4b and/or the SPD material 2.

Laminates were made with EVA (ethylene vinyl acetate) interlayer material using suitable conditions for EVA lamination and subsequently tested at 100° C. Other than conventional storage conditions, the EVA had not been processed in any other way prior to lamination with the SPD film. The on-state light transmission was measured at intervals during the test and the result of this experiment showed that the SPD in the laminate degraded more rapidly when it had the higher moisture content and more slowly when it had been dried prior to lamination (FIG. 2).

Figure 2:
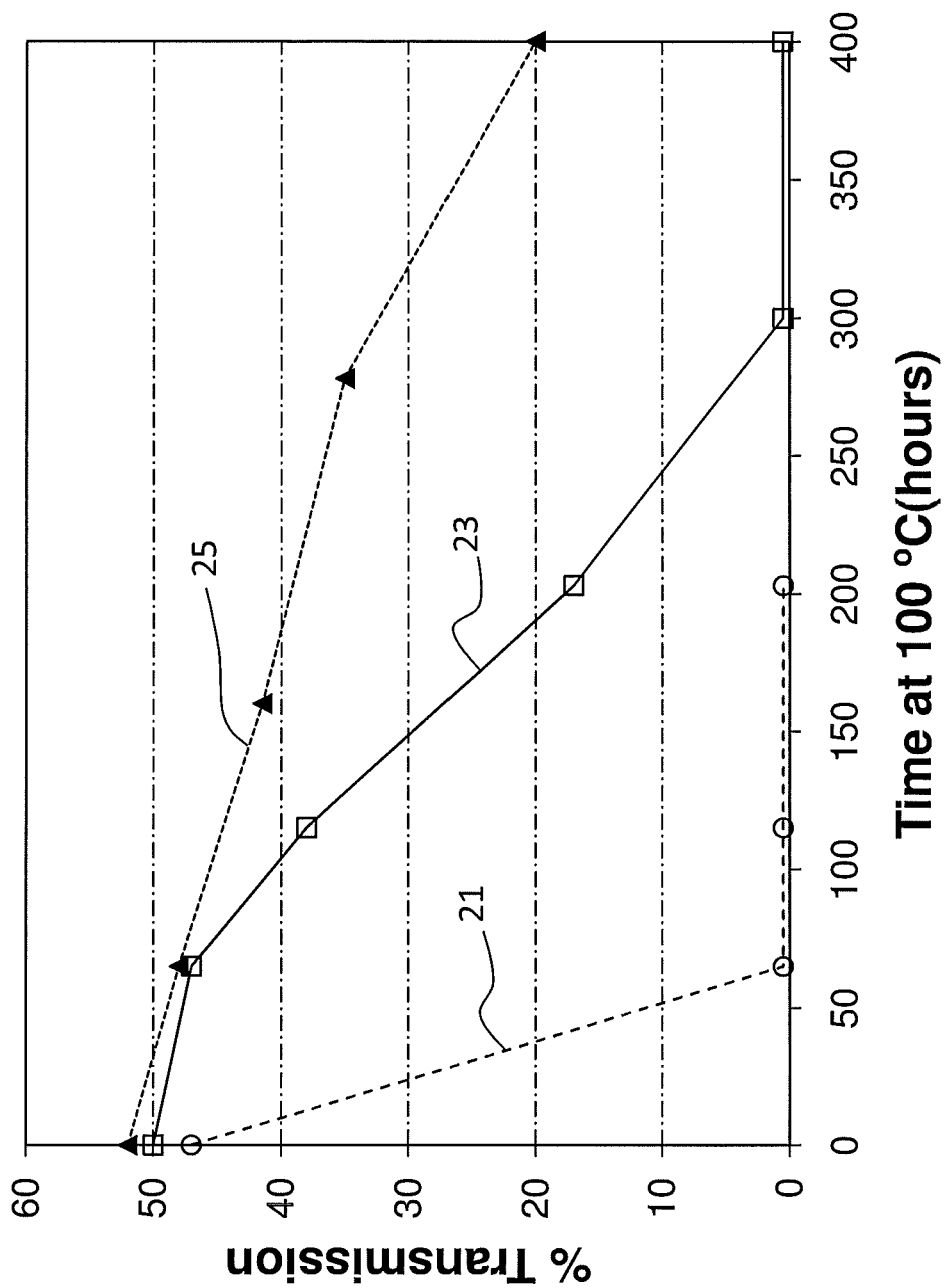
FIG. 2 is a graph of light transmission as a function of time for laminates containing EVA and SPD at various water contents that have been baked at 100° C.

In FIG. 2, line 21 shows how the on-state light transmission of the laminate made with standard EVA and "wet" SPD film varies with time when baked at 100° C. Line 23 shows how the on-state light transmission of the laminate made with standard EVA and standard SPD film varies with time when baked at 100° C. Line 25 shows how the on-state light transmission of the laminate made with standard EVA and "dry" SPD film varies with time when baked at 100° C.

The light transmission was measured using CIELAB Illuminant C 2° observer, although it is not essential to use this illuminant. The measurement of light transmission was taken through the centre of the major face of the laminate. The use of the light transmission measurement is a convenient way to show how well the SPD film is able to switch from the low transmission off-state to the high transmission on-state upon the application of an applied voltage across the SPD film, and is therefore indicative of the switching characteristics of the SPD film. When a suitable voltage is applied across the SPD film and the transmission is unchanged, the switching characteristics of the SPD film have degraded.

In order to make the light transmission measurement, the sample was taken out of the heating oven and allowed to cool to room temperature before the reading was made. Once the reading was made, the sample was placed back into the heating oven until the next measurement was made.

EXAMPLE 2

PVB (polyvinyl butyral) is a typical interlayer material used in laminated glazing for vehicles. In order to carefully control the adhesion of the PVB to glass which is an important parameter for an automotive laminated glazing, it is necessary to control the moisture content of PVB. This is generally achieved by storing PVB prior to lamination in temperature and humidity controlled conditions with 20+/−2° C. and 24+/−4% RH. This provides a water content of around 0.26 to 0.5%.

The inventors have discovered that by reducing the water content of the PVB below this level, a step improvement is found in the stability of the SPD laminate at temperature.

Laminates were prepared with four different configurations:
1. SPD film as standard, PVB as standard
2. SPD film dried prior to lamination, PVB as standard
3. SPD film as standard, PVB dried prior to lamination
4. SPD film dried prior to lamination, PVB dried prior to lamination The drying of the PVB was achieved by storing for 2 days under vacuum at room temperature. Drying may be effected by different means, such as by sealing the interlayer with a desiccant as illustrated in table 1. The moisture content of PVB and EVA are shown in table 1 below.

TABLE 1

Moisture content was determined by calibrated moisture analyser and/or Karl Fischer analysis.

| Preparation condition | Moisture Content (% by weight) |
|---|---|
| PVB after drying in vacuum oven | <0.1% |
| PVB from 24% RH/23 deg C. | 0.26% |
| EVA 24% RH/23° C. | 0.16% |
| EVA ambient conditions | 0.24% |
| EVA Sealed with desiccant | 0.08% |

The sample construction was as follows:
Glass/PVB/SPD/PVB/coated PET film/PVB/glass
where the PVB layers were all 0.38 mm thick and the coated PET was 0.05 mm thick. The overall sample thickness was about 5.2 mm.

The samples were all laminated at the same time using a temperature above 100° C. to produce an acceptable lamination.

Figure 3:
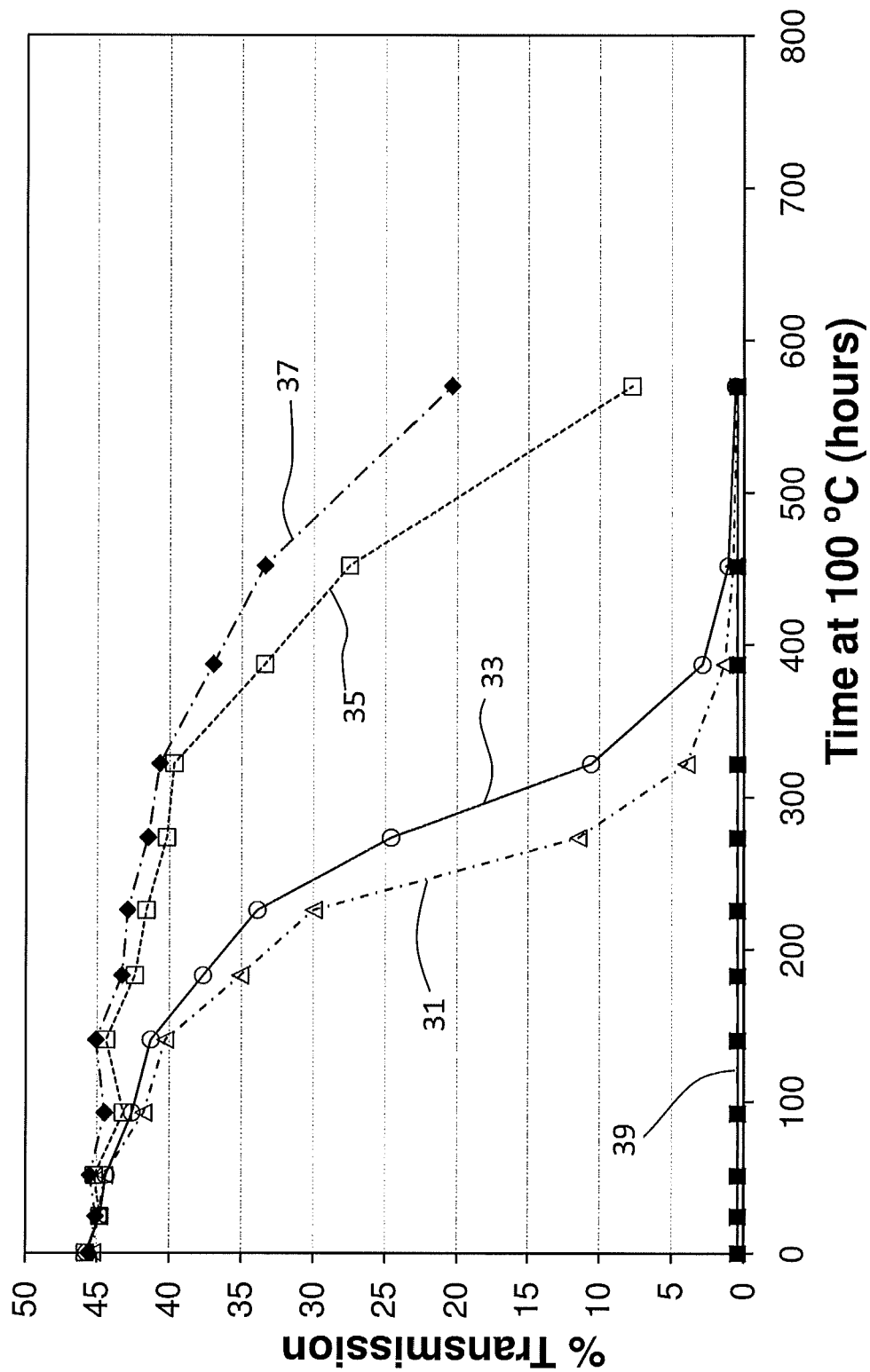
FIG. 3 is a graph of light transmission as a function of time for laminates containing SPDs and PVBs having different water contents that have been baked at 100° C.

After lamination the samples were baked at 100° C. and the change in on-state transmission monitored at intervals. The results are indicated in FIG. 3. The measurement of transmission was carried out in the same manner as described with reference to example 1.

Line 31 of FIG. 3 shows the variation of the on-state light transmission for standard SPD film laminated with a standard PVB interlayer (sample 1).

Line 33 shows the variation of the on-state light transmission when the SPD film has been dried (sample 2). There is an improvement in the switching characteristics of sample 2 compared to sample 1. That is, the SPD film is switchable between the low light transmission off-state and the high light transmission on-state for a longer time.

Line 35 shows the improvement in switching characteristics when the standard SPD film is laminated between PVB that has been dried (sample 3). The PVB is from the same batch as PVB as used to construct sample 1. As can be seen, the switching behaviour is improved compared to sample 1. That is, by drying the PVB interlayer material the SPD film is switchable between the low light transmission off-state and the high light transmission on-state for a longer time.

Line 37 shows the combined effect of reducing the water content of the SPD film and the PVB interlayer (sample 4). The variation in the on-state light transmission over time for sample 4 is least affected by baking at 100° C. It appears that the effect of drying the SPD film is additive with the effect of drying the interlayer material.

Line 39 shows the off-state light transmission for each sample. There is virtually no change in the off-state light transmission for any of the samples with time when baked at 100° C.

FIG. 3 shows that by drying the SPD film and/or the PVB interlayer, the switching characteristics of the laminated glazing can be improved compared to using standard SPD film and PVB. That is, by using a PVB that has a level of moisture below that of standard PVB, an improvement in the switching characteristics of the laminated glazing is obtained. The switching characteristics of the SPD film are maintained for a longer time when the SPD film and/or interlayer is dried, compared to using the same SPD film and/or interlayer material that has not been dried.

FIG. 3 shows that by use of an interlayer material that has been dried, the switching characteristics of the SPD film may be improved. That is, the time over which the SPD film is switchable between the low light transmission off-state and the high light transmission on-state has been increased.

Without being bound by any particular theory, it is thought that under the action of heat, water is released from the interlayer (and possibly the PET plies encompassing the SPD film). This water is able to penetrate the SPD matrix and cause the SPD particles to degrade. By using an interlayer that has a low water content, the degradation of the SPD particles may be delayed thereby increasing the time over which the SPD is switchable between the low light transmission off-state (i.e. when no voltage is applied) and the high light transmission on-state (i.e. when suitable voltage is applied).

It would be expected that if the same set of experiments were carried out using samples 1 to 4 but at a baking temperature of less than 100° C., similar behaviour would be observed as seen in FIG. 3 but the time over which the SPD film was switchable between the low light transmission off-state and the high light transmission on-state would be extended because of the lower baking temperature.

The invention claimed is:

1. A laminated switchable glazing comprising a suspended particle device, the laminated glazing comprising,
an SPD ply comprising the suspended particle device having a low light transmission off-state and a high light transmission on-state,
at least one interlayer ply comprising an interlayer material, and
at least one glazing ply,
wherein the interlayer material has a predetermined moisture content of 0.23 weight % or lower prior to lamination to increase the time over which the suspended particle device is switchable between the low light transmission off-state and the high light transmission on-state state when compared to the time over which the suspended particle device is switchable between the low light transmission off-state and the high light transmission on-state when the suspended particle device is in an equivalent laminated glazing where the interlayer material has not been dried to moisture content of 0.23 weight % or lower.

2. A laminated glazing as claimed in claim 1, wherein the suspended particle device comprises at least two spaced, opposed panes at least one of which is transparent, and a light modulating element.

3. A laminated glazing as claimed in claim 2, wherein the light modulating element comprises a liquid suspension of particles, preferably a plastics film comprising distributed droplets of the liquid suspension of particles.

4. A laminated glazing as claimed in claim 1, wherein the interlayer material comprises polyvinyl butyral, ethylene vinyl acetate, polyurethane or silicone.

5. A laminated glazing as claimed in claim 1, further comprising one or more plastics plies.

6. A laminated glazing as claimed in claim 5, wherein at least one of the plastics plies carries an infra red reflecting coating.

7. A laminated glazing as claimed claim 1 where there are two interlayer plies.

8. A laminated glazing as claimed in claim 1, wherein there are two glazing plies.

9. A laminated glazing as claimed claim 1, wherein the interlayer material has predetermined moisture content of 0.20 weight % or lower.

10. A laminated glazing as claimed in claim 1 wherein at least one of the plies carries a low emissivity or a solar control coating.

11. A laminated glazing as claimed in claim 1, wherein the, or each, glazing ply is a glass ply.

12. A process for producing a laminated switchable glazing comprising a suspended particle device, the process comprising:
   a) providing at least one interlayer ply comprising an interlayer material having a moisture content greater than 0.23 weight %,
   b) drying the interlayer material to a predetermined moisture content of 0.23 weight % or lower,
   c) providing a SPD ply comprising the suspended particle device,
   d) providing at least one glazing ply, and
   e) laminating together at least the SPD ply, the dried interlayer ply and the glazing ply.

13. A process as claimed in claim 12, wherein drying the interlayer material comprises holding the interlayer material at a predetermined temperature under a predetermined pressure for a predetermined time.

14. A process as claimed in claim 12, wherein drying comprises storing the interlayer material at a predetermined relative humidity.

15. A process for producing a laminated switchable glazing comprising a suspended particle device, the process comprising using an interlayer material which has been dried prior to lamination to have a water content of 0.24 weight % or lower as an interlayer in a laminated glazing comprising an SPD film as the suspended particle device to increase the time over which the suspended particle device is switchable between a low light transmission off-state and a high light transmission on-state when compared to the time over which the suspended particle device is switchable between the low light transmission off-state and the high light transmission on-state when the SPD film suspended particle device is in an equivalent laminated glazing where the interlayer material has not been dried to have a water content of 0.24 weight % or lower.

16. A process as claimed in claim 15, wherein the interlayer material is adjacent to the SPD film.

17. A process as claimed in claim 15, wherein the interlayer material comprises polyvinyl butyral, ethylene vinyl acetate, polyurethane or silicone.

18. A laminated glazing according to claim 1, wherein the SPD ply has been dried.

19. A process as claimed in claim 15, wherein the interlayer material has a water content of 0.23 weight % or lower.

20. A process as claimed in claim 15, wherein the SPD film has been dried.

* * * * *